US009169950B2

(12) United States Patent
Sorbi

(10) Patent No.: US 9,169,950 B2
(45) Date of Patent: Oct. 27, 2015

(54) CONNECTOR FOR FLEXIBLE HOSES

(75) Inventor: Marco Sorbi, Castel Guelfo (IT)

(73) Assignee: FLEXIN GROUP S.r.l. (IT)

(*) Notice: Subject to any disclaimer, the term of this patent is extended or adjusted under 35 U.S.C. 154(b) by 0 days.

(21) Appl. No.: 14/006,144

(22) PCT Filed: Mar. 27, 2012

(86) PCT No.: PCT/IB2012/051444
§ 371 (c)(1),
(2), (4) Date: Sep. 19, 2013

(87) PCT Pub. No.: WO2012/131572
PCT Pub. Date: Oct. 4, 2012

(65) Prior Publication Data
US 2014/0015247 A1    Jan. 16, 2014

(30) Foreign Application Priority Data

Mar. 28, 2011  (IT) .............................. BO2011A0156
Oct. 18, 2011  (IT) .............................. BO2011A0588

(51) Int. Cl.
*F16L 33/18* (2006.01)
*F16L 13/14* (2006.01)
*F16L 33/207* (2006.01)

(52) U.S. Cl.
CPC .................. *F16L 13/14* (2013.01); *F16L 33/18* (2013.01); *F16L 33/2073* (2013.01); *Y10T 29/49826* (2015.01)

(58) Field of Classification Search
CPC .............................. F16L 33/2073; F16L 33/18

USPC ......................................................... 285/256
See application file for complete search history.

(56) References Cited

U.S. PATENT DOCUMENTS

| 1,477,573 | A | | 12/1923 | Lowrey | |
| 2,453,997 | A | * | 11/1948 | Macwilliam | 285/256 |
| 2,797,111 | A | * | 6/1957 | Beazley | 285/256 |
| 3,578,360 | A | * | 5/1971 | Eliot | 285/256 |
| 4,522,435 | A | * | 6/1985 | Miller et al. | 285/256 |
| 4,817,997 | A | | 4/1989 | Ingram | |

(Continued)

FOREIGN PATENT DOCUMENTS

DE        9102495        5/1991
DE      202006010346     11/2007

(Continued)

OTHER PUBLICATIONS

International Search Report and Written Opinion dated Jun. 1, 2012 from PCT/IB2012/051444.

*Primary Examiner* — David E Bochna
(74) *Attorney, Agent, or Firm* — Timothy J. Klima; Shuttleworth & Ingersoll, PLC

(57) ABSTRACT

A connector for flexible hoses, comprising: a hollow main body forming an element for coupling with a flexible hose comprising at least two ramp-like annular elements, separated by at least one circumferential recess and forming a housing for a sealing element; at least one sealing element, designed to be positioned in the recess; and at least one clamping element designed to apply a force in a radial direction on the outer surface of the flexible hose when the flexible hose is coupled with the hollow main body, and operating in conjunction with the sealing element to allow, in use, a sealed coupling between the flexible hose and the hollow main body.

23 Claims, 6 Drawing Sheets

(56) References Cited

U.S. PATENT DOCUMENTS

| | | | |
|---|---|---|---|
| 5,096,231 A * | 3/1992 | Chisnell et al. | 285/256 |
| 5,378,023 A * | 1/1995 | Olbrich | 285/256 |
| 6,010,162 A * | 1/2000 | Grau et al. | 285/256 |
| 6,099,045 A * | 8/2000 | Pirona | 285/256 |
| 6,443,500 B1 * | 9/2002 | Inoue et al. | 285/256 |
| 6,450,549 B1 * | 9/2002 | Schutz | 285/256 |
| 6,460,897 B1 * | 10/2002 | Manuli | 285/256 |
| 6,523,862 B1 * | 2/2003 | MacDuff | 285/256 |
| 6,598,905 B2 * | 7/2003 | Campbell et al. | 285/256 |
| 6,598,906 B2 * | 7/2003 | Brugmann | 285/256 |
| 6,772,519 B2 * | 8/2004 | St. James et al. | 285/256 |
| 6,874,823 B2 * | 4/2005 | Viegener | 285/256 |
| 7,017,949 B2 * | 3/2006 | Luft et al. | 285/256 |
| 7,293,804 B2 * | 11/2007 | Li et al. | 285/256 |
| 7,364,206 B2 * | 4/2008 | Romanelli et al. | 285/256 |
| 7,384,074 B2 * | 6/2008 | He | 285/256 |
| 7,516,990 B2 * | 4/2009 | Jamison et al. | 285/256 |
| 8,342,578 B2 * | 1/2013 | Bobenhausen | 285/256 |
| 8,439,405 B2 * | 5/2013 | Trujillo et al. | 285/256 |
| 8,727,386 B2 * | 5/2014 | Koch | 285/256 |
| 2006/0220378 A1 * | 10/2006 | Li et al. | 285/242 |
| 2010/0148490 A1 | 6/2010 | Bobenhausen | |

FOREIGN PATENT DOCUMENTS

| | | |
|---|---|---|
| DE | 202008006797 | 7/2008 |
| EP | 1441167 | 7/2004 |
| EP | 1882876 | 1/2008 |
| EP | 1933073 | 6/2008 |
| GB | 2177769 | 1/1987 |
| WO | 95/33157 | 12/1995 |
| WO | 00/19137 | 4/2000 |
| WO | 03/064912 | 8/2003 |
| WO | 2008/009573 | 1/2008 |

* cited by examiner

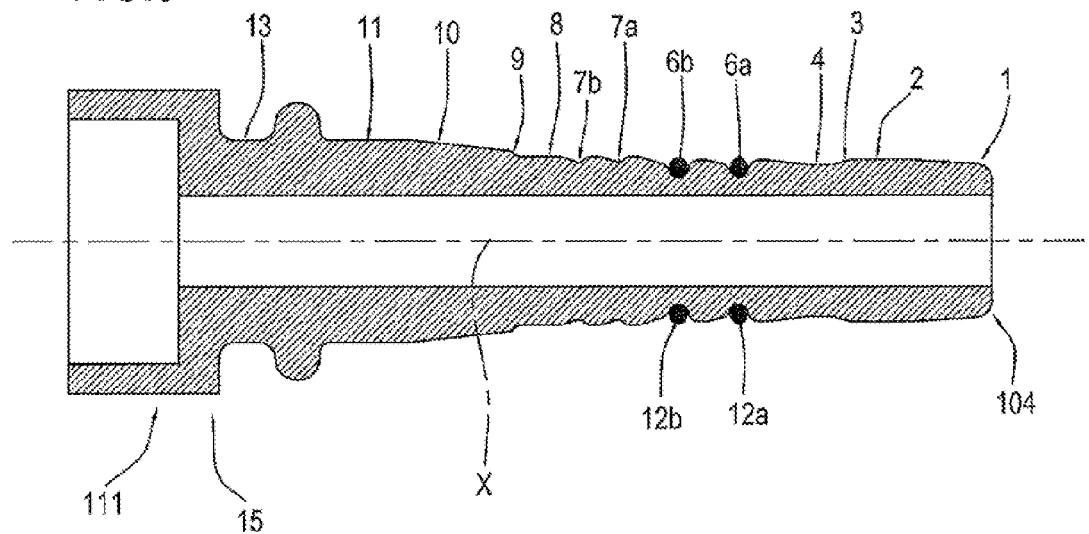
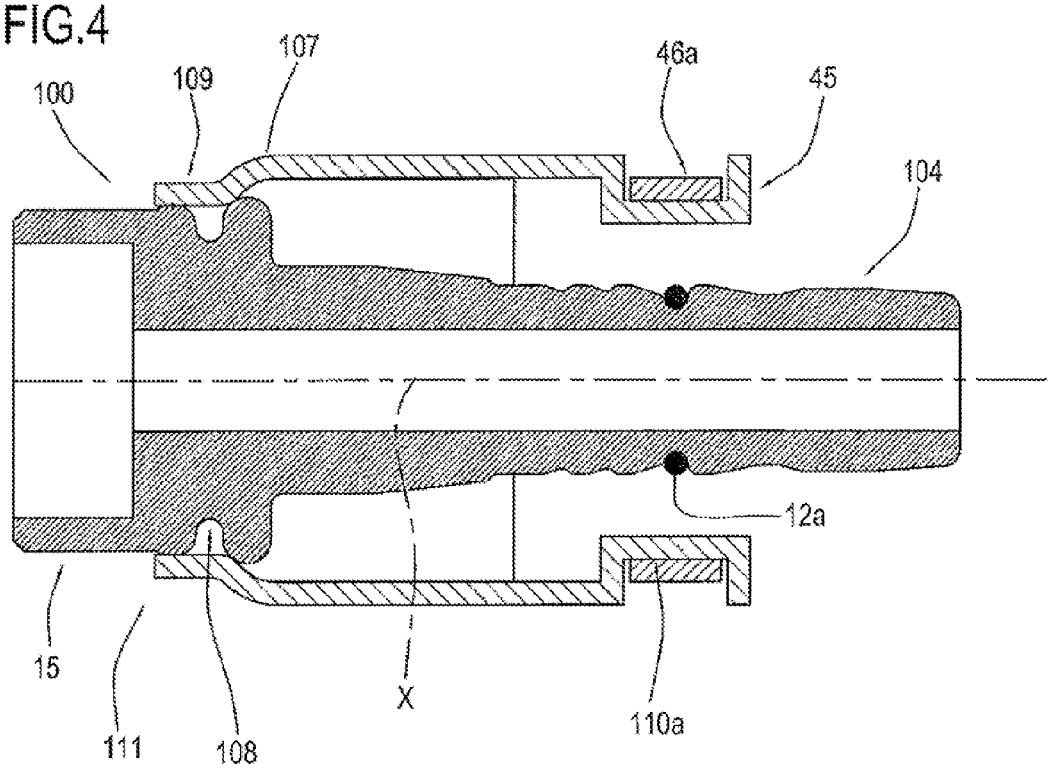

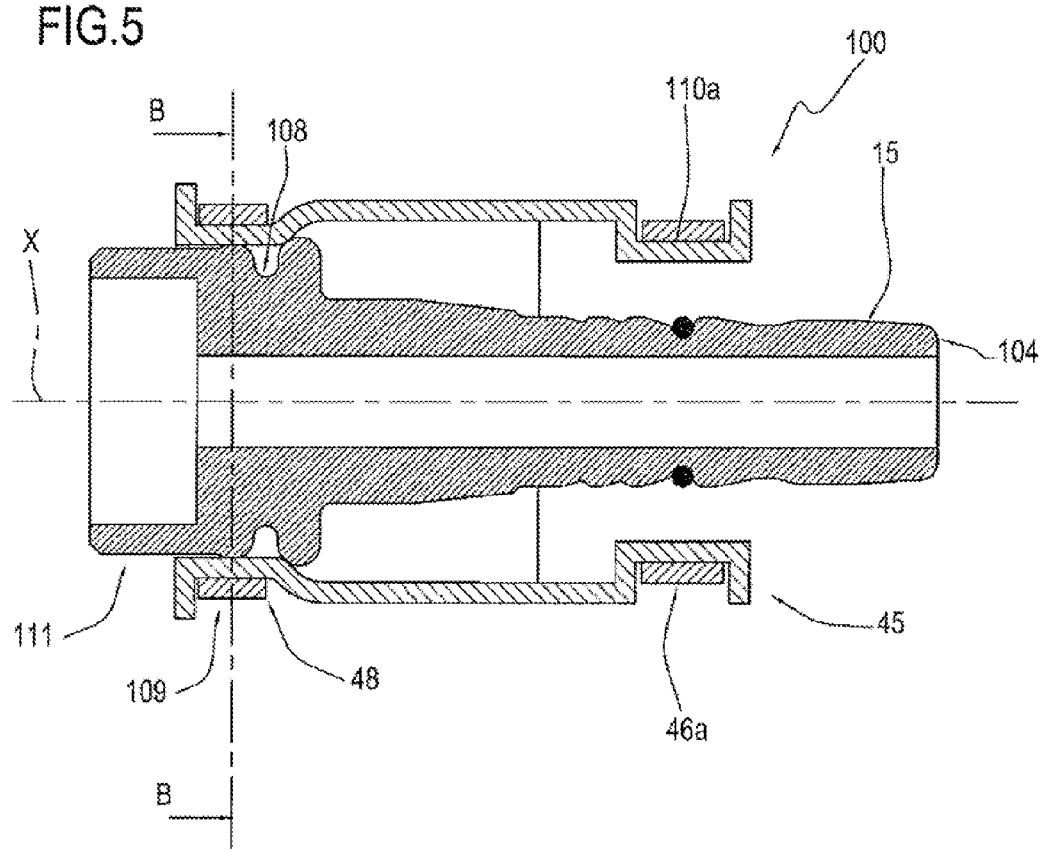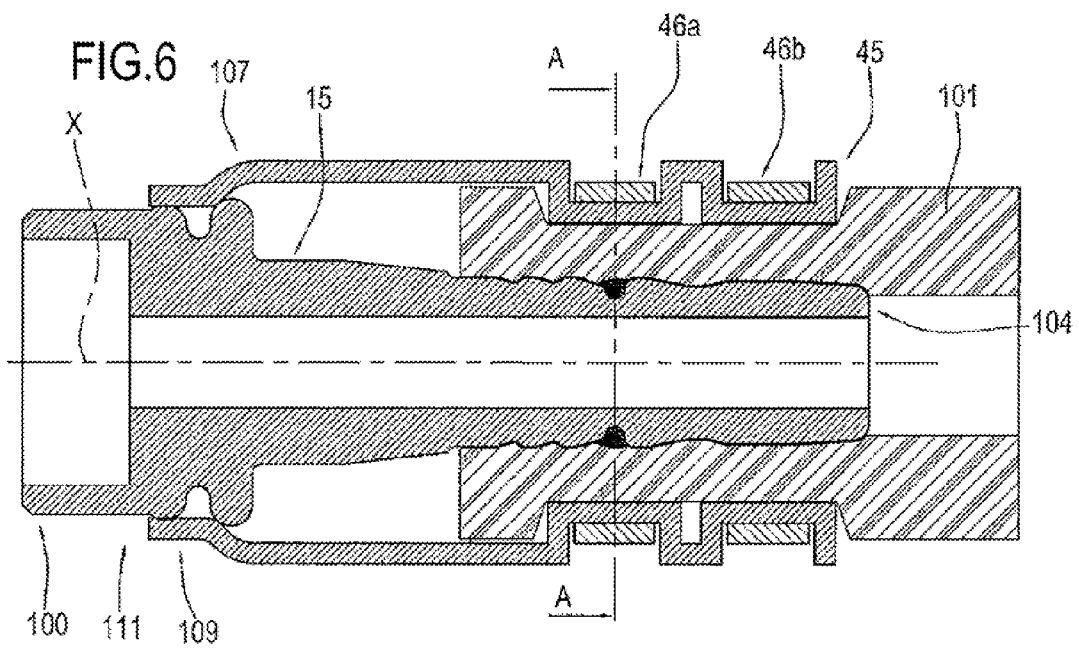

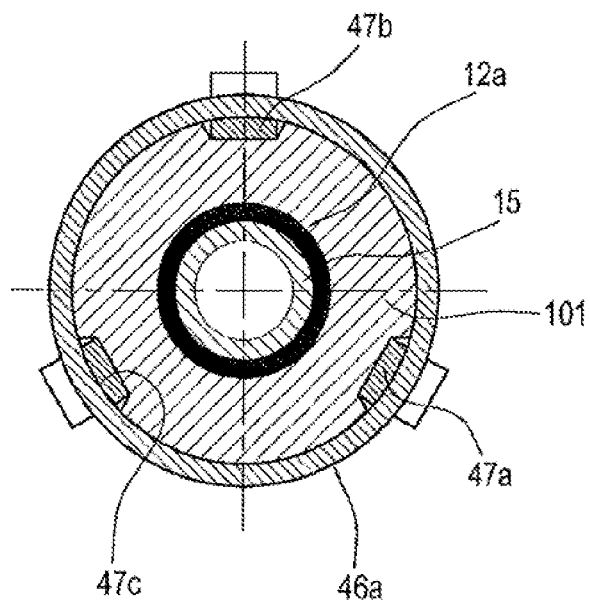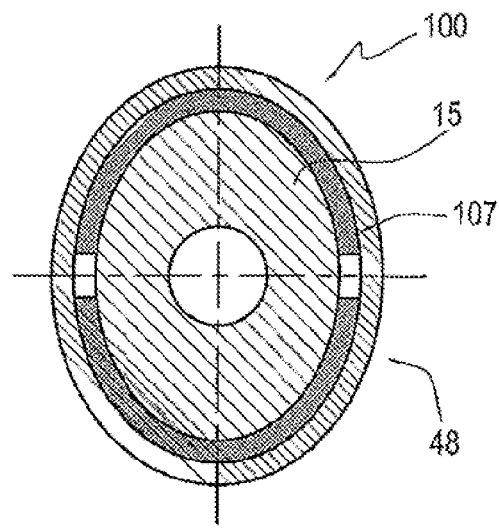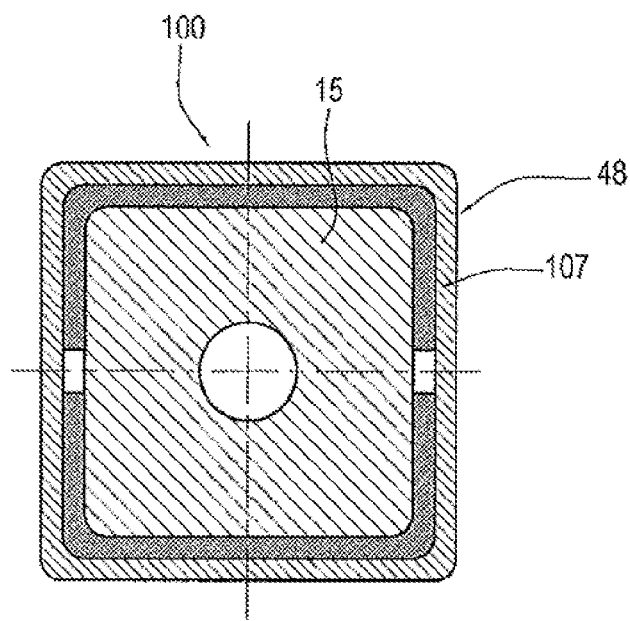

CONNECTOR FOR FLEXIBLE HOSES

This application is the National Phase of International Application PCT/IB2011/051444 filed Mar. 27, 2012 which designated the U.S. and that International Application was published under PCT Article 21(2) in English.

This application claims priority to Italian Patent Application No. BO2011A000156 filed Mar. 28, 2011 and Italian Patent Application No. BO2011A000588 filed Oct. 18, 2011. Both applications are incorporated by reference herein.

TECHNICAL FIELD

This invention relates to a connector for flexible hoses, for use in cooling and/or conditioning systems, on both mobile and fixed systems.

BACKGROUND ART

An example of a prior art connector is described in document WO 95/33157.

That document describes a body with two circumferential recesses which house two sealing elements having an arched shape in the zone in contact with the inner surface of the hose. The ratio of the size of the recesses and of the sealing element, together with the geometry of the sealing element, guarantees that a seal is maintained.

It should be noticed that in the connector described in document WO95/33157, the high level of interference present between the hose and the connector requires a special widening tool to allow fitting of the connector in the hose.

This is due to the fact that the body is equipped with ramp-like elements which are also designed to prevent the connector from coming off the hose.

However, it should be noticed that such ramp-like elements may cause tears on the inner part of the hose.

But such a connector does not allow lasting performance, due to the relatively large dimensions of the contact surface between the hose and the sealing element.

Another example of a prior art connector is described in document WO 00/19137.

Document WO 00/19137 describes a connector in which the positioning and holding in place of O-ring type sealing elements is guaranteed by the size of the recess.

In that connector the O-ring cross-section centre point is positioned below the edge of the recess.

Outside the hose, at each sealing element, there is a metal clip, clamped to a predetermined diameter, thus applying a pressure between the inner surface of the hose and the sealing element, sufficient to guarantee a correct seal for the assembly.

Application of the pressure needed to guarantee the connector seal can be carried out using crimped rings or reusable systems.

One problem with the connector described above is due to the fact that the shape of the connector at the recesses for housing the O-ring sealing elements, with a circular cross-section, does not guarantee that such sealing elements remain in position during fitting of the hose, particularly where lubricants are not used. In fact, the hose drags the O-ring axially along the connector, imparting a rotary movement and forcing it out of its seat, even if the depth of the seat is greater than the radius of the O-ring.

It should be noticed that the chain of dimensional tolerances of the assembly made up of the connector, the O-ring and the hose, together with the variability of the mechanical features of the elastomers used, may create the disadvantage of forcing the O-ring out of the recess and dragging it on the cylindrical element by means of a rolling phenomenon.

That disadvantage causes delays and various problems in operations for assembling the hose-connector system and, in the worst cases, may result in a connector malfunction.

Document EP 1933073 describes a connector which has a profile with a plurality of ramps and a seat interposed between two ramps in which an O-ring is inserted.

The seat for the sealing element is shaped with a bottom wall and two lateral walls at right angles to it. The sealing element is inserted in the seat with axial play.

This type of connector has the same disadvantage as previously encountered, that is to say, the O-ring is forced out of the seat during the assembly step.

Connectors substantially similar to the previous one in EP 1933073 are described in documents DE202008006797, EP 1882876 and WO03/064912. Even for those types of connectors there is the disadvantage of the O-ring being forced out of the seat during the assembly step.

DISCLOSURE OF THE INVENTION

The main aim of this invention is to overcome the above-mentioned disadvantages, by providing a connector which guarantees a perfect seal for the coolant fluid in all operating conditions and which allows robust insertion of the connector in the hose without the use of a special widening tool, therefore avoiding any problems of forcing the O-ring out of its seat.

BRIEF DESCRIPTION OF THE DRAWINGS

Further features and advantages of this invention are more apparent in the description which follows of a non-limiting preferred embodiment of a connector for flexible hoses according to the invention, illustrated by way of example in the accompanying drawings, in which:

FIG. 3 is a schematic view of a detail of a second embodiment of the invention;

FIG. 4 is a schematic view of a first embodiment of the invention;

FIG. 5 is a view of an alternative embodiment of the invention to that of FIG. 4;

FIG. 6 is a view of an alternative embodiment of the invention to that of FIGS. 4 and 5;

FIG. 7 is a cross-section of the invention in FIG. 6, according to the plane A-A at a right angle to the axis of extension of the main body;

FIGS. 8 and 9 are respectively cross-sections of different embodiments of the invention in FIG. 5, according to the plane B-B at a right angle to the axis of extension of the main body;

DETAILED DESCRIPTION OF THE PREFERRED EMBODIMENTS OF THE INVENTION

Figure 1:
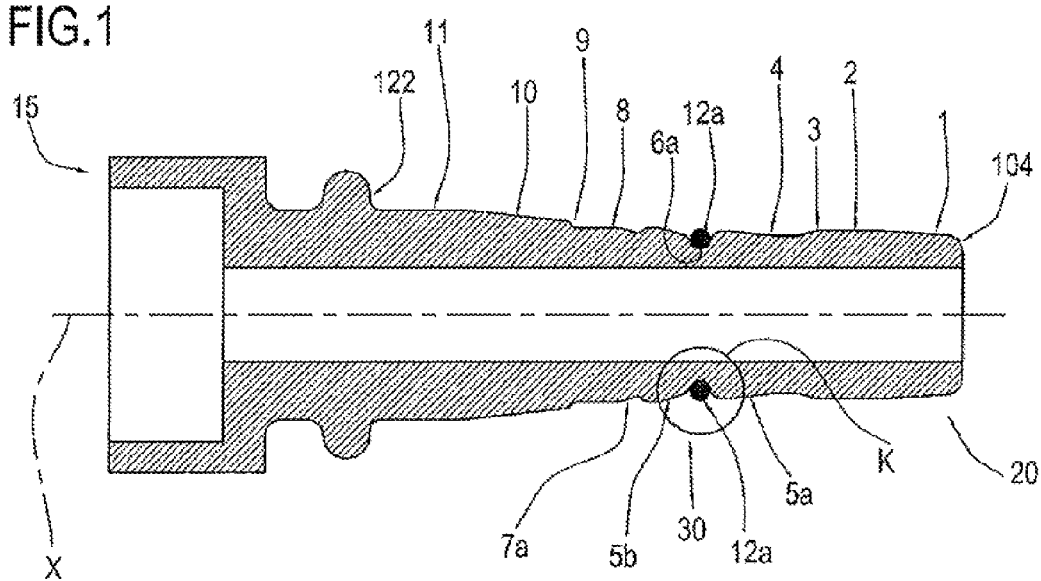
FIG. 1 is a schematic view of a detail of a first embodiment of the invention.

In particular, the connector (labelled 100 in the accompanying drawings) comprises a hollow main body 15 which forms a coupling element 15 for a flexible hose 101.

It should be noticed that the flexible hose 101 is fitted to the hollow main body 15 in such a way that the outer surface of the main body 15 is positioned inside the hose and there is fluid communication between the flexible hose 101 and the inner cavity of the hollow main body 15.

The coupling element 15 (or hollow main body 15) comprises (usually together with other elements) at least one O-ring 12a, 12b whose positioning is defined by a recessed annular element 6a, 6b and by ramp-like annular elements 5a, 5b, 5c which are adjacent and separated or spaced out.

The recessed annular element 6a, 6b forms a seat for the sealing element 12a, 12b.

The hollow body 15 comprises an end zone, labelled 20 in FIG. 1, shaped to promote insertion of the hollow body 15 in the hose 101.

Hereinafter the embodiment shown in FIG. 1 is described by way of example only and without limiting the scope of the invention.

The end zone 20 comprises two frustoconical elements 1, 3, with the larger base separated by a cylindrical element 2.

A second cylindrical element 4 separates the end zone 20 from the sealing zone 30, that is to say, the zone where the sealed coupling is established between the hollow body 15 and the flexible hose 101.

The sealing zone 30 is formed by a set of at least two ramp-like annular elements 5a, 5b, separated by at least one recess 6a, which forms a seat for the sealing element 12a, 12b.

The two ramp-like annular elements 5a, 5b are adjacent to at least one annular groove 7a.

The annular groove 7a is adjacent to a region with cylindrical cross-section 8, ending with a substantially vertical wall 9.

When it is completely fitted on the hollow body 15 (that is to say, coupled to the latter), the flexible hose 101 makes contact with the substantially vertical wall 9.

The vertical wall 9 is connected to a frustoconical zone or wall 10.

The frustoconical zone or wall 10 is connected to a cylindrical region 11 ending with a further vertical wall 122.

The recess 6a is designed to house the sealing element 12a, preferably an O-ring.

The positioning of the sealing element 12a is guaranteed by the ram-like elements 5a, 5b which are designed to contain and guide the sealing element 12a, 12b.

That prevents the disadvantage encountered in the prior art, where there is often dragging of the sealing element during fitting of the flexible hose, which consequently forces the sealing element out of its seat. That aspect is described in more detail below, with a detailed description of the special shape of the recess 6a far housing the sealing element 12a.

The ramp-like elements 5a, 5b preferably have an axial separation distance substantially equal to the width of the recess 6a, or the diameter of the sealing element 12a.

That layout of the ramp-like elements 5a, 5b advantageously simplifies assembly, guiding the sealing element 12a into the recess 6a and guarantees that the sealing element 12a remains in position during assembly, due to the big increase in diameter.

To guarantee an effective sealing action, the height L of the sealing element 12a (measured before fitting the flexible hose 101 to the hollow body 15) is greater than the height H of the surrounding ramps 5a, 5b.

The term height refers to the distance—in a radial direction—from the axis X of the hollow body 15.

It should be noticed that, more generally, the O-ring 12a forms a sealing element between the hollow body 15 and the hose 101 and prevents any accidental leakage (of fluid or gas) during use.

Preferably the sealing element is an O-ring 12a with a circular (radial) cross-section.

Even more preferably, that sealing element is of the O-ring type.

It should also be noticed that the sealing element 12a may also have other geometries than those illustrated in the accompanying drawings (for example, it could have a square, oval, etc. radial cross-section).

The following should be noticed relative to the recess 6a, 6b designed to contain the sealing element.

Figure 2:
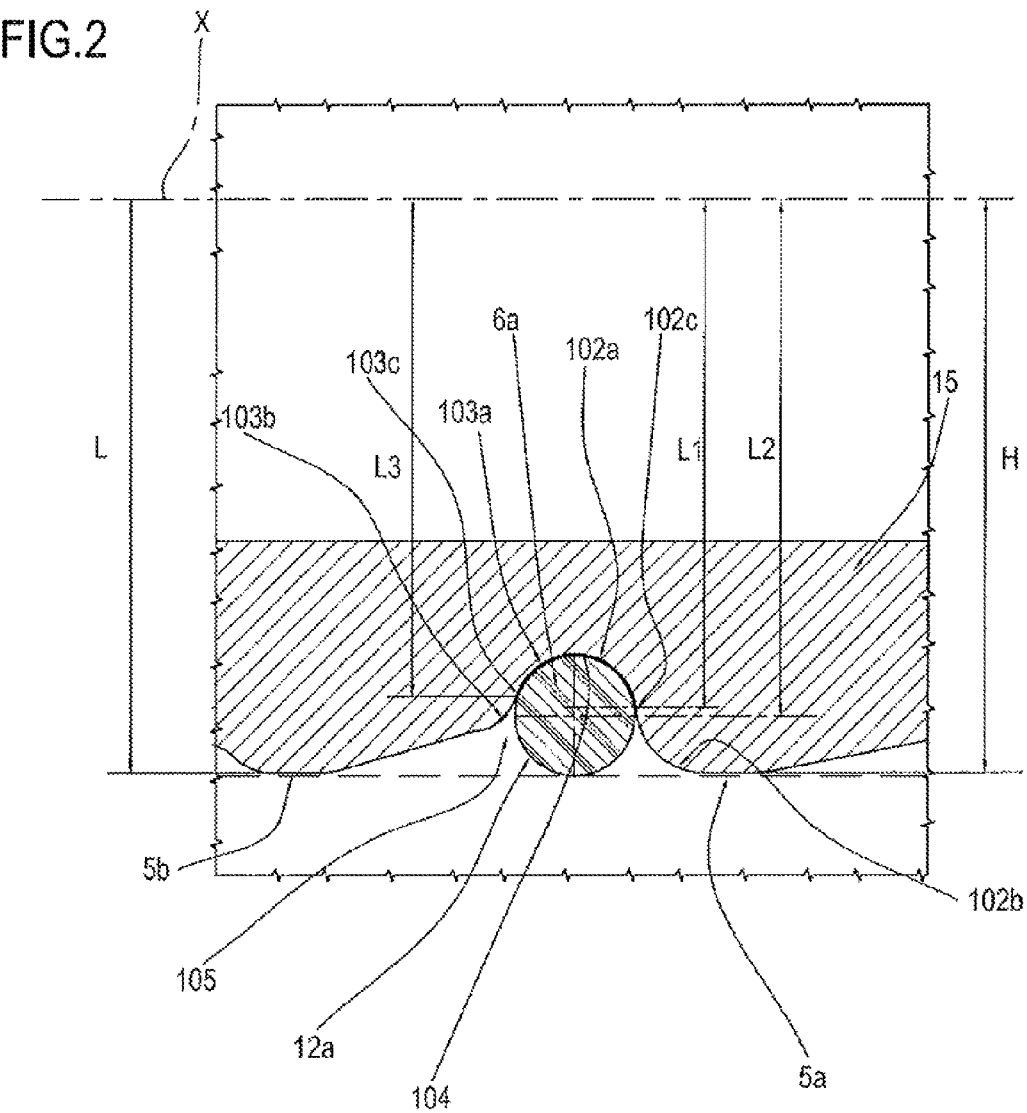
FIG. 2 is a view of a detail K from FIG. 1.
Figure 10:
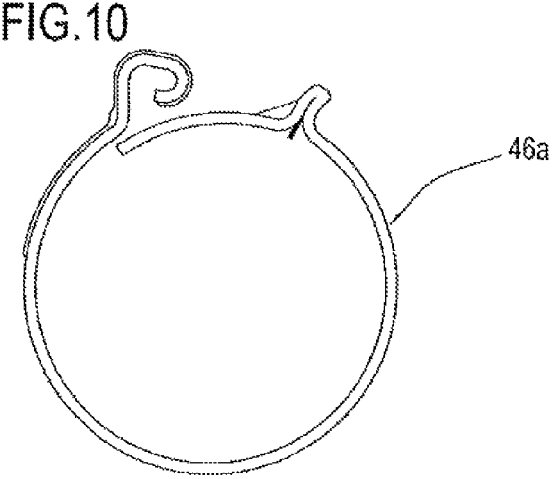
FIGS. 10 and 11 illustrate a detail of the invention from FIGS. 4 to 6.
Figure 11:
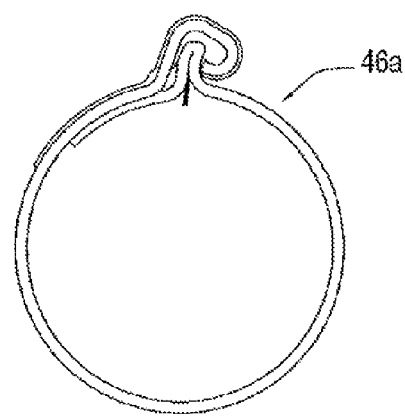

The recess 6a, 6b is clearly shown in FIG. 2.

FIG. 2 is a scaled-up view of a detail K from FIG. 1.

It should be noticed (FIG. 2) that the recess 6a, 6b has a pair of lateral walls 102, 103 with an arched profile.

The term "arched" profile refers to a curved profile.

Said lateral walls 102, 103 are, respectively, proximal and distal relative to the end 104 of the main body 15 (where the flexible hose 101 is fitted).

Each of the lateral walls 102, 103 is the wall of a ramp 5a, 5b. Respectively, the lateral wall 102 is the wall of the first ramp 5a, while the lateral wall 103 is the lateral wall of the second ramp 5b.

Preferably, at least one lateral wall 102, 103 of the recess 6a has a concavity inversion in the axial direction X of extension of the hollow body 15.

Preferably, as illustrated in FIG. 2, both of the lateral walls of the recess 6a have a concavity inversion in the axial direction X of extension of the hollow body 15.

With regard to that, it should be noticed that the portion 102a, 103a of the lateral walls 102, 103 of the recess 6a proximal to the bottom of the recess 6a has a concavity facing outwards (radially) away from the axis X of the hollow body 15, while the portion 102b, 103b of the lateral walls 102, 103 of the recess 6a distal from the bottom of the hollow body 15 has a concavity facing towards the axis X of the hollow body 15.

Said lateral walls 102, 103 may be directly connected or they may be connected by a further bottom wall 104. In the latter case, the recess 6a comprises a first lateral wall 102, a bottom wall 104 and a second lateral wall 103.

FIG. 2 shows the bottom wall 104 although it is difficult to identify.

Preferably the bottom wall 104 has a substantially straight profile.

It should be noticed that for each lateral wall 102, 103 of the recess 6a a point of inflection 102c; 103c can be identified, where the change in concavity occurs.

It should be noticed that preferably and advantageously the (radial) distance of that point of inflection 102c; 103c from the axis X of the body 15 is less than the (radial) distance of the central point 12c of the radial cross-section of the sealing element 12a from the axis X of the hollow body 15.

It should be noticed that the expression central point 12c refers to the centre of symmetry of the cross-section (if the cross-section has symmetry) or the centre of gravity of the cross-section.

It should be noticed that for a sealing element 12a with circular cross-section (FIG. 2) the central point 12c of the sealing element 12a coincides with the centre of the circular cross-section.

In particular, with reference to the rear ramp 5b delimiting the recess 6a (that is to say, the one with which the flexible hose 101 comes into contact last when the flexible hose 101 is coupled with the hollow body 15), it should be noticed that the fact that the point of inflection 12*c* is positioned closer to the axis X of the hollow body 15 than the central point 12*c* of the sealing element 12*a* allows a region (or physical space) 105 to be formed which is particularly ample and is occupied by the sealing element 12*a* when the flexible hose 101 is coupled with the hollow body 15 and the sealing element 12*a* is compressed.

In other words, the sealing element 12*a*, when compressed by the flexible hose 101, deforms in such a way that it occupies that region 105.

To better illustrate this aspect, it should be noticed that at the region 105 a particularly high specific pressure is created between the flexible hose 101 and the O-ring 12*a* (usually greater than that of the remaining region of contact between the O-ring 12*a* and the flexible hose 101). Advantageously, that allows a particularly effective seal to be guaranteed between the O-ring 12*a* and the flexible hose 101 in that region 105.

Therefore, although the seal is guaranteed by the O-ring 12*a* along the entire region of contact with the flexible hose 101, the presence of said expansion region 105, which is occupied by the O-ring 12*a* when compressed, allows a particularly secure and optimum lasting seal to be guaranteed.

With reference to the shape of the recess 6*a*, comprising lateral walls 102 and 103 having an arched profile (which are connected directly or by means of a further bottom wall 104 preferably having a straight profile parallel with the axis X of extension of the hollow body 15), it should be noticed that in that way advantageously the recess 6*a* is easy to make by means of permanent set processing.

In fact, in permanent set operations it is particularly advantageous to make recesses which are free of sharp edges.

It should be noticed that in prior art connectors the recesses for O-rings comprise a pair of lateral surfaces which are connected to a bottom surface with sharp edges. That type of recess is difficult to obtain using permanent set processing.

Moreover, the fact that the lateral wall 102, 103 has a profile with concavity inversion allows axial definition of the expansion region 105 described above and obtainment of the above-mentioned sealing advantages.

It should also be noticed that the recess 6*a* and the O-ring 12*a* are sized relative to each other in such a way that there is substantially no (or only a limited amount of) axial play (that is to say, in the direction of extension of the axis X) of the O-ring 12*a* in the recess 6*a*. That prevents any unwanted axial movement of the O-ring 12*a* during use.

The following should be noticed with reference to the hollow body 15.

In the condition for use, the application of a pressure to the outside of the hose 101, at the O-ring 12*a*, 12*b*, by a retaining element (preferably annular), such as a crimped ring or clip, compresses the flexible hose on the coupling element 15 of the connector, creating the seal.

Therefore, it should be noticed that in order to create a particularly effective sealed connection between the hose 101 and the connector 100, at least one clamping element 40, 45 must be used, designed to apply a force in a radial direction on the outer surface of the flexible hose 101, and to operate in conjunction with the sealing element 12*a* for allowing, in use, a particularly effective sealed coupling between the flexible hose 101 and the hollow body 15.

The clamping element 40, 45, the O-ring 12*a* and the hollow body 15 are all part of the connector according to the invention.

It should be noticed that the fluids used for cooling and conditioning have small molecules. That feature makes it particularly challenging to prevent said fluids from permeating through the walls of the flexible hoses and in the coupling region between the flexible hose and the connector.

In an attempt to reduce the permeation of fluids through the walls of the hoses, manufacturers developed different architectures, which can be categorised based on the materials used and their position in the hose.

There are hoses which are made entirely of elastomeric material, with an inner thermoplastic coating and hoses in which an intermediate thermoplastic film is placed between two rubber layers, which act as the inner and outer interface of the hose. The structure of the flexible connectors described above is strengthened by the application of one or more strengthening braids.

The use of plastic materials as an inner coating for the hose has the disadvantage of not guaranteeing an effective seal in the contact zone with the metal connector. Moreover, the mechanical features of the plastic material used do not help to absorb vibrations coming from operating conditions and from the components of the circuit they are connected to.

In contrast, the connector according to the invention allows a particularly effective seal to be obtained even with flexible hoses which have plastic materials inside them.

Use of a clamping element 40, 45 allows the application of a force from the outside in, at the sealing element 12*a*, guaranteeing the correct pressure conditions between the sealing element 12*a* and the inner wall of the flexible hose 101, so as to prevent the connector from coming out in operating conditions.

It should be noticed that there are various embodiments of the clamping element 40, 45.

The clamping element 40, 45 may be a ring or a bush 40 (which may be crimped to the hollow body 15) or a clip, clamped to a predetermined diameter.

Clip-style clamping is described below.

Clip positioning in the axial direction relative to the connector is performed using at least three longitudinal elements 47*a*, 47*b*, 47*c* whose ends are connected to the main body 15 in the region called the latch area 13.

Preferably, the number of said longitudinal elements 47*a*, 47*b*, 47*c* is greater than or equal to three. That advantageously allows an increase in the seal even in situations in which the flexible hose is subject to movements relative to the hollow body 15 whether axial, radial, twisting and/or a combination of these for example when the flexible hose is connected to a moving part of a machine or during seal tests in which it is deliberately subjected to pulling, lateral bending and twisting).

In fact, with three or more longitudinal elements 47*a*, 47*b*, 47*c* the flexible hose is, in use, rigidly connected to the hollow body 15, and is substantially prevented from moving.

In other words, there is no direction in which, if the flexible hose 101 were to be moved relative to the hollow body 15, there could be the risk—in the long-term—of a loss of seal.

In fact, it should be noticed that, in particular in applications in which the hose is subject to pulling forces and/or small movements, there is a particular risk of loss of seal as time passes.

It should be noticed that, preferably, the longitudinal elements 47*a*, 47*b*, 47*c* are connected to each other to form a single cage-like element 107 (FIGS. 4 and 7).

The cage-like element 107 therefore comprises the longitudinal elements 47*a*, 47*b*, 47*c* and a base 109 to which the longitudinal elements 47*a*, 47*b*, 47*c* are rigidly connected.

The base 109 is designed for coupling with the hollow body 15 at the latch area 13.

It should be noticed that the base 109 preferably has a tubular shape with a central hole for receiving the hollow body 15.

The base 109 is fitted on the hollow body 15 and is locked at the latch area 13.

It should be noticed that the cage-like element 107 (in particular the base 109) may be fixed to the hollow body 15 by clinching, flaring, welding or brazing, creating a permanent connection.

In particular, according to a preferred method, the cage-like element 107 is locked to the hollow body 15 by a permanent set operation.

Preferably, according to this aspect, the base 109 is subject to a permanent set operation in such a way that a portion of material is inserted in a recess 108 made at the latch area of the hollow body 15.

It should be noticed that the cage-like element 107 is securely locked to the hollow body 15. In particular, there is no possibility of rotation between the elements 15 and 107.

The fact that rotation is prevented between the cage-like element 107 and the hollow body 15 prevents the possibility of rotation of the flexible hose 101 relative to the hollow body 15 during use. That avoids any risk of the potential loss of seal which may occur in prior art solutions.

Therefore, it should be noticed that the cage-like element 107 and the hollow body 15 are locked in such a way that together they form a single element (which in the sector is referred to as "one piece").

A further embodiment for allowing connection of the clamping element 45 to the hollow body 15 is shown in FIGS. 8 and 9. The solution comprises making a shaped region in the latch area 13, for example having oval or polygonal cross-sections.

The same geometry is replicated in a clip 48 rigidly connected to the clamping element. That clip is clamped in the latch area 13, in such a way as to prevent rotation and slipping off.

In other words, it should be noticed (FIGS. 8 and 9) that the outer surface of the hollow body 15 and the inner hole of the base 109 of the cage-like element must be shaped in such a way that they do not have an axially symmetrical geometry (for example oval geometry, square, etc.) and that, when coupled, they are locked to prevent them rotating relative to each other.

The component parts of the connector are preferably made of metal material by turning or permanent set.

The clip unit 45 may be made of metal, plastic, composite material er a combination of these.

It should be noticed that—compared with the prior art solutions the permanent connection between the clip unit 45 and the hollow body 15, together with the presence of longitudinal and transversal elements, compressed against the outer wall of the flexible connector, creates strong anchoring, preserving the sealing zone and preventing the hose from coming off and rotating, therefore drastically reducing the risk of coolant fluid leaks.

In other words, as described above, the combination of a cage having longitudinal elements 47a, 47b, 47c and of clips 46a, 46b allows optimum locking of the flexible hose 101.

The following description refers to the aspect relating to clamping of the flexible hose 101 and further aspects of the connector according to this invention.

It should be noticed that, as can be seen in the accompanying drawings (in particular FIG. 1), the O-ring 12a positioned in the recess 6a has a radial extension—measured from the axis X of the hollow body 15—which is greater than that of any point of the profile of the hollow body 15 between the end 104 of the hollow body 15 (designed to receive the flexible hose 101) and the recess 6a for the O-ring 12a.

Therefore, in this way, the flexible hose 101 is not radially widened beyond the radial height of the O-ring 12a before encountering the O-ring 12a.

With reference to locking, it should be noticed that a locking element 40, 45 is normally provided.

The locking element 40, 45 is secured (or stably fixed to prevent its axial movement, and rotation) relative to the hollow body 15.

It should be noticed that a first embodiment of the locking element comprises a substantially tubular body, that is to say a bush 40, which is connected to the hollow body 15 at an end portion 111 of the latter, opposite the end 104 where the flexible hose 101 is fitted.

Therefore, the connector is an assembly comprising the bush 40, sealing element 12a and hollow body 15.

In this embodiment the end user of the connector fits the flexible hose 101 to the hollow body 15, joining the flexible hose to the end 104 of the body and longitudinally fitting the flexible hose 101 on the hollow body 15.

It should be noticed that after the user has put the hose in the correct configuration relative to the hollow body 15, the user must deform the bush 40 radially at least at one axial region, to allow the hose to be stably retained relative to the hollow body 15 in a predetermined position.

Therefore, the bush 40 is radially deformed at least at one axial zone to increase the connector sealing action. In fact, it should be noticed that the deformed bush 40 radially compresses the flexible hose 101 and presses it against the sealing element 12a, thus guaranteeing a particularly effective seal.

Preferably, the bush 40 is deformed at the axial zone or zones where the O-ring 12a is present.

The following is a description of a second locking method, comprising the use of a cage-like element 107.

The cage-like element 107 comprises a base 109 from which a plurality of longitudinal elements 47a, 47b, 47c extend.

The base 109 is substantially tubular.

It should be noticed that the base 109 is locked to the body 15, usually at an end portion 111 of the body 15 opposite the end 104 where the flexible hose 101 is fitted.

The base 109 can be locked using various methods: permanent set, welding, or using other clamping means (clip, etc.).

Figure 12:
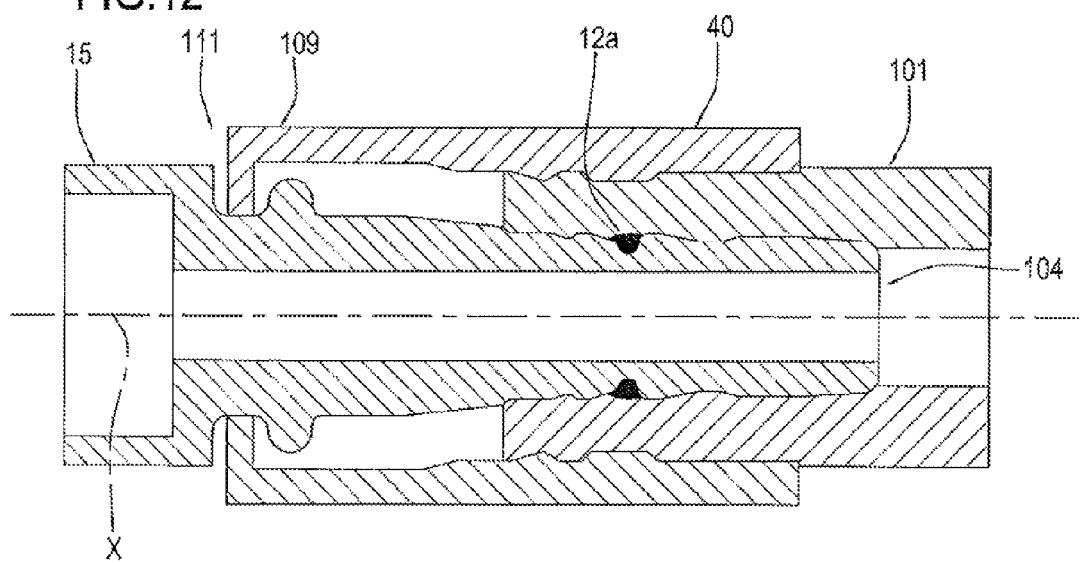
FIG. 12 is a schematic view of a further embodiment of the device according to the invention.

It should be noticed that in both the embodiment with the cage-like element 107 and that with the bush 40 (FIG. 12) the cage-like element 107 or the bush have a longitudinal portion for retaining the hose 101 which in use is positioned at the sealing zone 30 (that is to say, where the O-ring 12a is located) and a portion for fixing to the body 15 which in use is located at the end 111 of the body 15 opposite the end 104 where the flexible hose 101 is fitted.

With reference to locking the bush 40 or the cage-like element 107 to the hollow body 15, there are various locking methods: crimping, permanent set, welding, etc.

However, it should be noticed that according to the invention said locking allows the bush 40 or the cage-like element 107 to be stably connected to the hollow body 15.

It should be noticed that, after the bush 40 or the cage-like element has been locked to the hollow body 15, the connector is a one piece device.

It should be noticed that making a "one piece" connector guarantees the absence of errors caused by incorrect assembly of the components, reducing waste, the risk of assembly failure and assembly times.

The invention claimed is:

1. A connector for flexible hoses, comprising:
 a hollow main body forming an element for coupling with a flexible hose comprising at least two annular ramp elements, separated by a circumferential recess and forming a housing for a sealing element,
 a sealing element, positioned in the recess;
 a clamping element configured to apply a force in a radial direction on an outer surface of the flexible hose when the flexible hose is coupled with the hollow main body, and operating in conjunction with the sealing element to provide, in use, a sealed coupling between the flexible hose and the hollow main body; the clamping element including:
  a tubular base portion fixedly connected to the hollow main body;
  a plurality of longitudinal elements extending axially from the base portion to surround the flexible hose when the flexible hose is coupled with the hollow main body;
  a mechanism for radially compressing the longitudinal elements to radially compress the flexible hose;
 wherein the fixed connection between the tubular base portion and the hollow main body prevents rotation and translation of the tubular base portion relative to the hollow main body;
 wherein the recess for housing the sealing element comprises a pair of lateral walls, at least one of the lateral walls having a concavity inversion profile in a direction of an axis of the hollow main body.

2. The connector for flexible hoses according to claim 1, wherein the two annular ramp elements are adjacent to an annular groove.

3. The connector for flexible hoses according to claim 1, wherein the sealing element is an O-ring.

4. The connector for flexible hoses according to claim 1, wherein a radial extension of the sealing element measured from an axis of the hollow main body when the sealing element is in position in the recess and before coupling the flexible hose with the hollow main body, is greater than a radial extension, measured from the axis of the hollow main body, of the annular ramp elements.

5. The connector for flexible hoses according to claim 1, wherein a radial extension of the sealing element, measured from an axis of the hollow main body when the sealing element is in position in the recess and before coupling the flexible hose with the hollow main body, is greater than a radial extension, measured from the axis of the hollow main body, of a profile of the hollow main body located between the recess and an end of the hollow main body where the hose is fitted.

6. The connector for flexible hoses according to claim 1, wherein the recess for housing the sealing element comprises a bottom wall, connected to the lateral walls, and has a substantially straight profile.

7. The connector for flexible hoses according to claim 1, wherein the recess for housing the sealing element comprises a bottom wall; and wherein the at least one of the lateral walls comprises a first portion proximal to the bottom wall of the recess and having a concavity facing outwards away from the axis of the hollow body and a second portion distal from the bottom wall of the recess and having a concavity facing toward the axis of the hollow body, the second portion establishing a region for receiving the sealing element when, in use, the sealing element is deformed by the compressing action applied by the flexible hose.

8. The connector for flexible hoses according to claim 7, wherein the at least one of the lateral walls includes a concavity inversion and a distance of a central point of a radial cross-section of the sealing element from an axis of the hollow body, measured when the flexible hose is not coupled with the main body, is greater than that of a point of inflection of the at least one of the lateral walls at the concavity inversion.

9. The connector for flexible hoses according to claim 8, wherein the at least one of the lateral walls is at a greater distance from the end of the hollow main body where the flexible hose is fitted than another of the lateral walls.

10. The connector according to claim 1, wherein the annular ramp elements adjacent to the annular recess are positioned at a distance substantially equal to a width of the annular recess.

11. The connector according to claim 1, and further comprising a clinched coupling fixedly connecting the base portion to the hollow main body.

12. The connector according to claim 1, and further comprising a flared connection fixedly connecting the base portion to the hollow main body.

13. The connector according to claim 1, and further comprising a welded connection fixedly connecting the base portion to the hollow main body.

14. The connector according to claim 1, and further comprising a brazed connection fixedly connecting the base portion to the hollow main body.

15. The connector according to claim 1, wherein the mechanism for radially compressing comprises a clip engaging the longitudinal elements.

16. The connector according to claim 15, wherein the longitudinal elements comprise a seat for housing the clip.

17. The connector according to claim 16, wherein, when the base portion is coupled with the hollow main body and the clip is positioned in the seat, the clip is located axially at the sealing element.

18. A method for making a connector for flexible hoses, comprising:
 preparing a hollow main body forming an element for coupling with a flexible hose, the hollow main body comprising at least two annular ramp elements, separated by a circumferential recess forming a housing for a sealing element,
 preparing a sealing element and positioning it in the recess;
 preparing a clamping element for applying a force in a radial direction on an outer surface of the flexible hose when the flexible hose is coupled with the hollow main body, thus operating in conjunction with the sealing element to seal between the flexible hose and the hollow main body;
 wherein the clamping element comprises:
  a tubular base portion fixedly connected to the hollow main body;
  a plurality of longitudinal elements extending axially from the base portion to surround the flexible hose when the flexible hose is coupled with the hollow main body;
  a mechanism engaging the longitudinal elements to radially compress the longitudinal elements and the flexible hose;
 the fixed connection of the tubular base portion to the hollow main body preventing rotation and translation of the tubular base portion relative to the hollow main body;
 the recess for housing the sealing element comprising a pair of lateral walls, at least one of the lateral walls having a concavity inversion profile in a direction of an axis of the hollow main body.

19. The method of claim 18, wherein the mechanism engaging the longitudinal elements comprises a clip.

20. The method of claim 19, wherein the longitudinal elements comprise a seat for housing the clip.

21. The method of claim 20, wherein, when the base portion is coupled with the hollow main body and the clip is positioned in the seat, the clip is located axially at the sealing element.

22. A connector for flexible hoses, comprising:
a hollow main body forming an element for coupling with a flexible hose comprising at least two annular ramp elements, separated by a circumferential recess and forming a housing for a sealing element,
a sealing element, positioned in the recess;
a clamping element configured to apply a force in a radial direction on an outer surface of the flexible hose when the flexible hose is coupled with the hollow main body, and operating in conjunction with the sealing element to provide, in use, a sealed coupling between the flexible hose and the hollow main body; the clamping element including:
a tubular base portion fixedly connected to the hollow main body;
a plurality of longitudinal elements extending axially from the base portion to surround the flexible hose when the flexible hose is coupled with the hollow main body;
a mechanism for radially compressing the longitudinal elements to radially compress the flexible hose;
wherein the fixed connection between the tubular base portion and the hollow main body prevents rotation and translation of the tubular base portion relative to the hollow main body;
wherein the recess for housing the sealing element comprises a pair of lateral walls and a bottom wall connected to the lateral walls;
wherein at least one of the lateral walls comprises a first portion proximal to the bottom wall of the recess and having a concavity facing outwards away from an axis of the hollow body and a second portion distal from the bottom wall of the recess and having a concavity facing toward the axis of the hollow body, the second portion establishing a region for receiving the sealing element when, in use, the sealing element is deformed by the compressing action applied by the flexible hose.

23. The connector for flexible hoses according to claim 18, wherein the at least one of the lateral walls includes a concavity inversion and a distance of a central point of a radial cross-section of the sealing element from an axis of the hollow body, measured when the flexible hose is not coupled with the main body, is greater than that of a point of inflection of the at least one of the lateral walls at the concavity inversion.

* * * * *